United States Patent [19]

Shimizume

[11] Patent Number: 5,453,964
[45] Date of Patent: Sep. 26, 1995

[54] DATA PROCESSING CIRCUIT FOR DISC PLAYER

[75] Inventor: Kazutoshi Shimizume, Kanagawa, Japan

[73] Assignee: Sony Corporation, Tokyo, Japan

[21] Appl. No.: 353,159

[22] Filed: Dec. 9, 1994

Related U.S. Application Data

[63] Continuation of Ser. No. 40,154, Mar. 30, 1993, abandoned.

[30] Foreign Application Priority Data

Mar. 31, 1992 [JP] Japan ................. 4-105904

[51] Int. Cl.⁶ ........................................ G11B 7/00
[52] U.S. Cl. .................... 369/48; 369/59; 369/124; 369/44.32
[58] Field of Search .................. 369/60, 59, 48, 369/54, 50, 58, 32, 124, 44.26, 44.32, 44.27, 44.28, 44.29; 84/609; 360/36.1, 36.2, 37.1

[56] References Cited

U.S. PATENT DOCUMENTS

| | | | |
|---|---|---|---|
| 4,516,164 | 5/1985 | Moxon | 369/60 |
| 4,631,714 | 12/1986 | Kahlman et al. | 369/59 |
| 4,707,805 | 11/1987 | Narusawa et al. | 369/60 |
| 4,707,818 | 11/1987 | Suzuki et al. | 369/32 |
| 4,796,247 | 1/1989 | Vogelsang | 369/44.32 |
| 4,995,026 | 2/1991 | Makabe et al. | 369/59 |
| 5,138,925 | 8/1992 | Koguchi et al. | 84/609 |
| 5,157,513 | 10/1992 | Yamashita | 369/44.32 |
| 5,315,400 | 5/1994 | Kuraka et al. | 369/58 |

FOREIGN PATENT DOCUMENTS

| | | |
|---|---|---|
| 0260722A3 | 3/1988 | European Pat. Off. . |
| 0400810A2 | 12/1990 | European Pat. Off. . |

OTHER PUBLICATIONS

Journal of the Audio Engineering Society, vol. 36, No. 4, Apr. 1988, New York, USA, pp. 250–282; Pohlmann: "The Compact Disc Formats: Technology and Applications."
Patent Abstracts of Japan, vol. 7, No. 212 (P–224), 20 Sep. 1983 & JP–A–58 105, 472 (Sony), 23 Jun. 1983.

*Primary Examiner*—Georgia Y. Epps
*Assistant Examiner*—Nabil Hindi
*Attorney, Agent, or Firm*—Limbach & Limbach

[57] ABSTRACT

A reproduced data processing circuit having a subcode delimit information generator to generate subcode delimit information, which indicates a delimiter of the subcode, in response to at least one of two subcode sync signals detected from the subcode included, together with digital audio data, in the demodulated output obtained by reading the data from a digital audio disc and demodulating the same. A time base correction is executed for both the digital audio data and the subcode delimit information. The delimiter of the subcode is identified on the basis of such subcode delimit information, and a linking process is executed for the digital audio data in the individual unitary subcode frames. The time base positions of the PCM audio data to be linked are settled exactly to thereby enhance the reliability of the linking process.

3 Claims, 6 Drawing Sheets

| FRAME | | | | | | | | |
|---|---|---|---|---|---|---|---|---|
| 1 | | | | $S_0$ | | | | |
| 2 | | | | $S_1$ | | | | |
| 3 | $P_1$ | $Q_1$ | $R_1$ | $S_1$ | $T_1$ | $U_1$ | $V_1$ | $W_1$ |
| 4 | $P_2$ | $Q_2$ | $R_2$ | $S_2$ | $T_2$ | $U_2$ | $V_2$ | $W_2$ |
| 5 | | | | | | | | |
| 6 | | | | | | | | |
| . | | | | . | | | | |
| . | | | | . | | | | |
| 95 | $P_{93}$ | $Q_{93}$ | $R_{93}$ | $S_{93}$ | $T_{93}$ | $U_{93}$ | $V_{93}$ | $W_{93}$ |
| 96 | $P_{94}$ | $Q_{94}$ | $R_{94}$ | $S_{94}$ | $T_{94}$ | $U_{94}$ | $V_{94}$ | $W_{94}$ |
| 97 | $P_{95}$ | $Q_{95}$ | $R_{95}$ | $S_{95}$ | $T_{95}$ | $U_{95}$ | $V_{95}$ | $W_{95}$ |
| 98 | $P_{96}$ | $Q_{96}$ | $R_{96}$ | $S_{96}$ | $T_{96}$ | $U_{96}$ | $V_{96}$ | $W_{96}$ |
| 1 | | | | $S_0$ | | | | |
| 2 | | | | $S_1$ | | | | |
| | $P_1$ | $Q_1$ | $R_1$ | $S_1$ | $T_1$ | $U_1$ | $V_1$ | $W_1$ |
| | $P_2$ | $Q_2$ | $R_2$ | $S_2$ | $T_2$ | $U_2$ | $V_2$ | $W_2$ |

$S_0 = 00100000000001$
$S_1 = 00000000010010$

BEFORE DEMODULATION

DO     TURNED TO "1" IN RESPONSE TO So OR S1

D1
)
)
D7     AFRAM (FRAME NUMBER OF ABSOLUTE TIME)

$$\begin{matrix} 0\sim 75 \\ \text{or } 7F \end{matrix} \begin{pmatrix} 0 & 000 & 0000 \\ 75 & 111 & 0101 \end{pmatrix}$$

5,453,964

DATA PROCESSING CIRCUIT FOR DISC PLAYER

This is a continuation of application Ser. No. 08/040,154, filed on Mar. 30, 1993, now abandoned.

BACKGROUND OF THE INVENTION

1. Field of the Invention

The present invention relates to a data processing circuit for a disc player designed for playback of a digital audio disc known as a compact disc (CD) and, more particularly, to a reproduced data processing circuit adapted for use in a shock-proof CD player contrived to solve a problem of track jump caused by shock.

2. Description of the Related Art

In the conventional shock-proof CD players known heretofore, it has been generally customary that, upon occurrence of a track jump due to some shock or the like in a playback mode, a pickup device is returned to the position immediately before occurrence of such track jump, and the playback operation is started again from that position. Then the PCM audio data reproduced after resumption of the playback operation is linked, by the use of a great-capacity RAM, to the reproduced PCM audio data obtained immediately after such track jump, whereby the prerecorded music or the like can be reproduced continuously without any intermission.

However, any of the CDs available at present has merely a subcode utilizable as an information index. Therefore, when a linking process is executed for the PCM audio data in response to a track jump in a shock-proof CD player, there is used a Q-channel time code in such subcode.

The subcode data can be reproduced immediately after eight-to-fourteen modulation (EFM). And since a deinterleaving process is not necessary, a time base correction (TBC) is not executed.

Meanwhile with regard to the reproduced PCM audio data, a time base correction is executed to reduce the wow and flutter derived from the rotation jitters and so forth of a CD driving motor. Therefore it is impossible to settle the positional relationship on the time base between the pre-TBC subcode data and the post-TBC PCM audio data, so that a decision is not exactly attainable as to when the latest reproduced audio information is outputted after the time base correction, whereby the joint of the PCM audio data is not detectable.

For the reason mentioned above, it is usual in the related art to execute the linking process by detecting several points where the PCM audio data are successively coincident.

However, in the method that detects several points of successive coincidence of the PCM audio data, there arise some problems including that, if any error exists in the PCM audio data, it becomes impossible to execute the proper linking process for the PCM audio data, and mislinking is prone to be induced in the case of no sound or a periodic signal of a fixed value to consequently deteriorate the operational reliability.

OBJECT AND SUMMARY OF THE INVENTION

It is an object of the present invention to provide a reproduced data processing circuit for a disc player capable of settling the time base positions of PCM audio data to be mutually linked and thereby enhancing the reliability in the linking process.

According to one aspect of the present invention, there is provided a reproduced data processing circuit having a subcode delimit information generator to generate subcode delimit information by detecting at least one of two subcode sync signals detected from the subcode which is included, together with digital audio data, in the demodulated output obtained by reading the data from a digital audio disc and demodulating the same. In this processing circuit, a time base correction is executed for both the digital audio data and the subcode delimit information and, after the delimiter of a unitary subcode frame is identified on the basis of the subcode delimit information, a linking process is executed for the digital audio data in the individual unitary subcode frames.

DETAILED DESCRIPTION OF THE PREFERRED EMBODIMENTS

Hereinafter an exemplary embodiment of the present invention will be described in detail with reference to the accompanying drawings.

Figure 2:
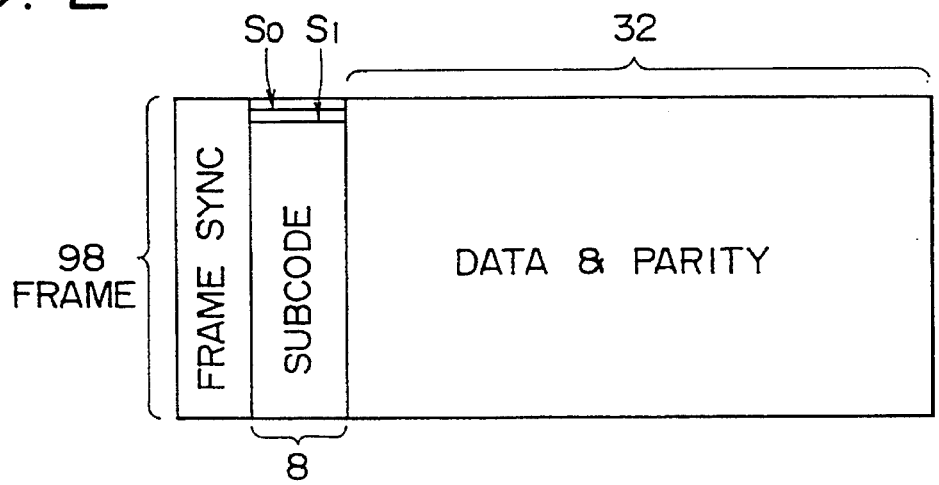
FIG. 2 schematically shows a CD signal format.

First a description will be given with regard to a CD signal format. In this format where one frame is processed as a unit, as obvious from FIG. 2, a frame sync signal is recorded at the beginning of each frame, and then a symbol composed of 8 bits (P to W) and termed a subcode is recorded in the same frame together with digital audio data and parity bits.

Figure 3:
FIG. 3 schematically shows a subcode format.
Figure 4:
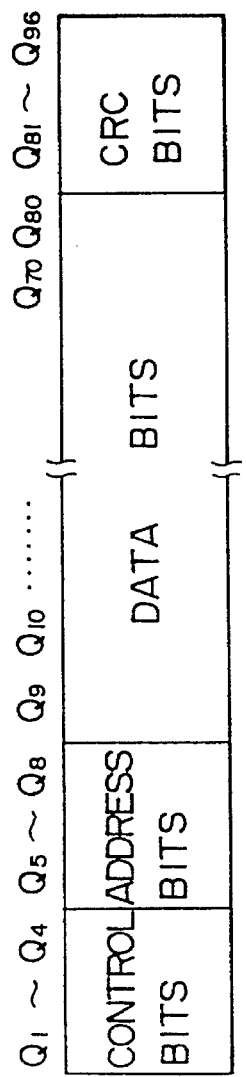
FIG. 4 is a format diagram showing the frame structure of a Q channel.

As shown in FIG. 3, the subcode constitutes a block which is composed of 96 bytes including two subcode sync signals S0 and S1 at the beginning. P-channel and Q-channel data in the subcode are used for access. More specifically, the P-channel data represents an interval between programs (e.g., musical pieces) and is used for rough cueing. Meanwhile the Q-channel data is used for finer control. The frame structure of such Q channel is shown in FIG. 4.

Figure 5:
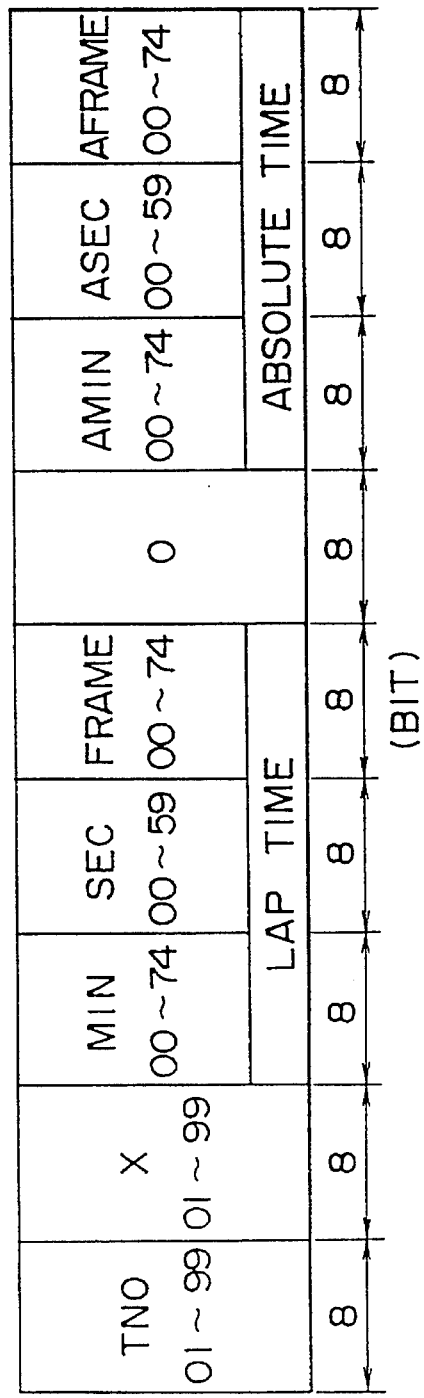
FIG. 5 shows the composition of the data portion in FIG. 4.

In this diagram, 4 control bits are used for identifying the number of audio channels, emphasis, digital data and so forth. Meanwhile 4 address bits are used for identifying operation modes. And in a given mode, the remaining 72-bit data has a format shown in FIG. 5. More specifically, the Q-channel data of the subcode represents a musical movement number corresponding to a chapter number in a book, an index corresponding to a paragraph number, an elapse time in the musical movement, and an absolute time.

Figure 1:
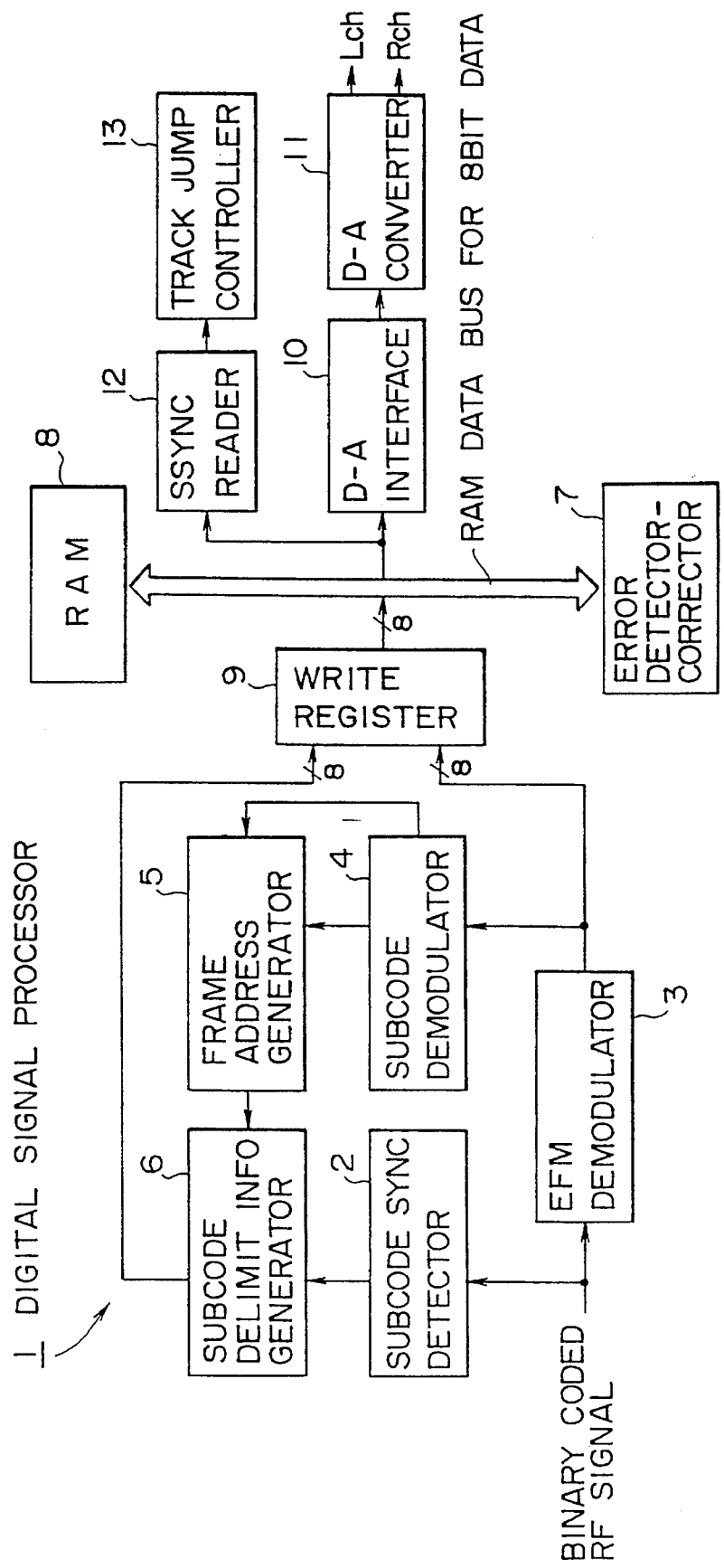
FIG. 1 is a block diagram of an embodiment representing the data processing circuit of the present invention.

FIG. 1 is a block diagram of an exemplary embodiment representing the data processing circuit of the present invention. In this diagram, a binary-coded RF signal read from a CD is supplied to a digital signal processor 1, wherein a subcode sync detector 2 detects subcode sync signals S0 and S1, while the EFM demodulator 3 performs EFM demodulation of the input RF signal. In a subcode demodulator 4, subcode data is demodulated by sampling the EFM demodulated data at a proper timing, and simultaneously an inspection is executed by a cyclic redundancy code (CRC) check as to whether the data is erroneous or not, whereby CRC check information is outputted.

Figure 7:
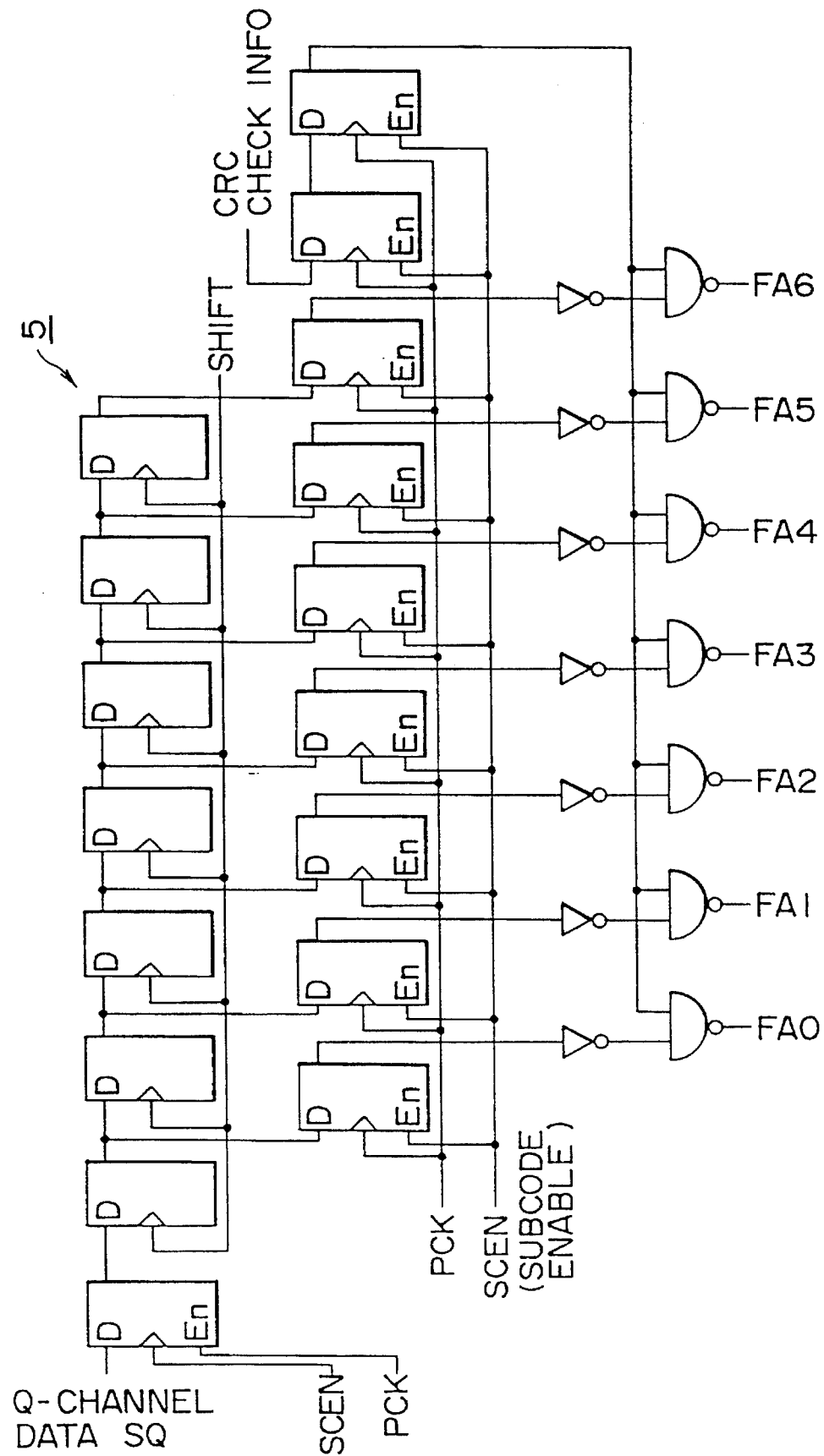
FIG. 7 is a block diagram showing an exemplary circuit configuration of a frame address generator.

In a frame address generator 5, the Q-channel data SQ out of the subcode data demodulated in the subcode demodulator 4 and inspected by the CRC check is inputted in response to a subcode enable signal SCEN generated at a rate of once per frame. And when the result of the CRC check is satisfactory on the basis of the CRC check information supplied from the subcode demodulator 4, a frame number AFRAM of the absolute time in the Q-channel data SQ is expressed by 7-bit frame addresses FA0–FA6 (0–75). Meanwhile, when the result of the CRC check is not satisfactory, there is outputted a maximum value (7F) of which entire 7 bits are "1". FIG. 7 shows a specific circuit configuration for realizing the above procedure.

A subcode delimit information generator 6 generates, in response to at least one of the subcode sync signals S0 and S1 detected in the subcode sync generator 2, 1-bit information indicating a delimiter of the subcode, and also generates a subcode delimit information SSYNC of 1 byte (8 bits) by adding to such 1-bit information the frame addresses FA0–FA6 produced in the frame address generator 5.

Figure 6:
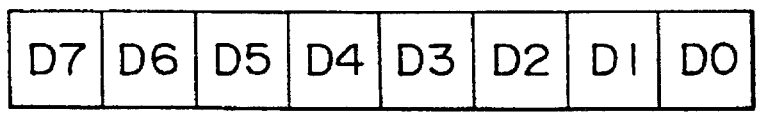
FIG. 6 shows the composition of subcode delimit information.

FIG. 6 shows a format of the subcode delimit information SSYNC. In this diagram, the least significant bit D0 serves as the information of a subcode delimiter, and the 7 higher-order bits represent the frame addresses FA0–FA6.

According to the subcode delimit information SSYNC, it is possible to identify the timing of generation of the subcode sync signal S0 or S1, the result of the CRC check relative to the Q-channel data of the subcode immediately before such timing, and the frame number.

The subcode delimit information SSYNC is recorded in a RAM 8 via a write register 9 together with the PCM audio data outputted from the EFM demodulator 3. The RAM 8 functions as a buffer for deinterleaving the cross interleave Reed Solomon code (CIRC) and correcting the error while further serving to absorb the rotation jitters and so forth by the time base correction, hence outputting high-precision digital audio signal.

In the RAM 8, there are recorded the subcode delimit information SSYNC obtained from the subcode delimit information generator 6, and the 32-symbol data of one frame from the EFM demodulator 3. And subsequently the 32-symbol data is supplied to an error detector-corrector 7.

The reproduced digital audio signal is supplied via a D-A interface circuit 10 to a D-A converter 11 where digital-to-analog conversion is performed, so that analog audio signals of a left (L) channel and a right (R) channel are outputted.

The subcode delimit information SSYNC time-base corrected together with the digital audio signal is read out by means of an SSYNC reader 12 and then is supplied to a track jump controller 13 which, upon occurrence of a track jump due to some shock or the like, controls a pickup device (not shown) and so forth by returning the pickup device to the position immediately before the occurrence of such track jump so as to resume the playback from that position.

Figure 8:
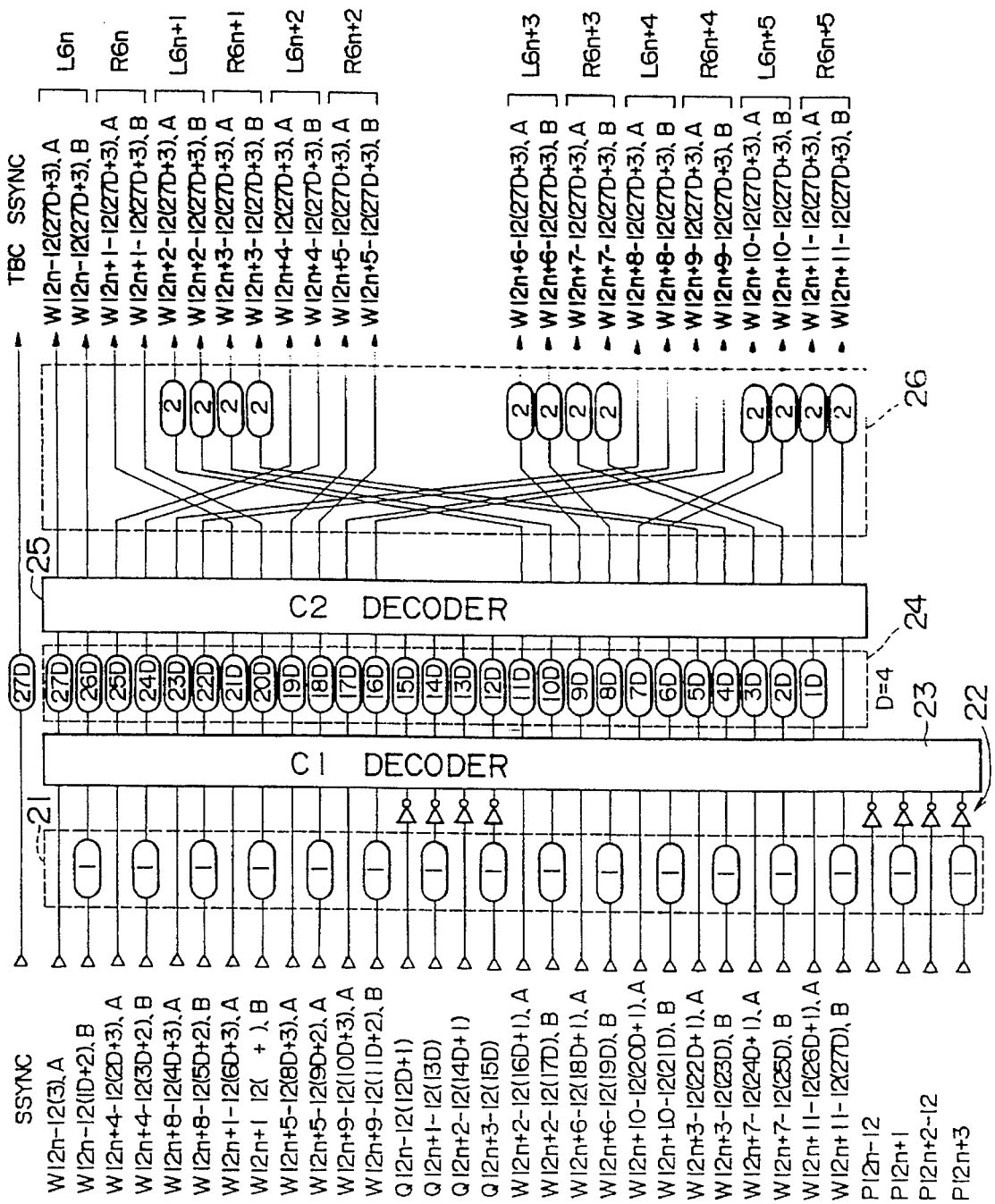
FIG. 8 shows a deinterleaving sequence of a cross interleave Reed Solomon code (CIRC).

FIG. 8 shows a deinterleaving sequence. In this diagram, the even-numbered symbols out of the 32-symbol data are delayed in an even delay system 21 by a time corresponding to one frame of the CIRC, so as to cancel out the delay of one frame effected merely to the odd-numbered symbols in the recording mode.

Subsequently the P and Q parity bits inverted in the recording mode are reinverted to resume the former state. Then, principally small random errors are corrected in a C1 decoder 23 and, after a deinterleave with a maximum delay of 108 (D=4) frames in a deinterleaver 24, principally burst errors are corrected in a C2 decoder 25.

Thereafter the data are rearranged in a descrambler 26 so that the former data arrangement prior to the recording is resumed. And the odd-numbered sample data are delayed by a time corresponding to 2 frames to thereby cancel out the 2-frame delay of the even-numbered symbols effected in the recording mode. In this procedure, the time base correction is executed in parallel with the operation of the C1 decoder.

Simultaneously therewith, the time base correction is executed also for the subcode delimit information SSYNC inputted from the subcode delimit information generator 6, and then the corrected information SSYNC is outputted after being delayed by a time corresponding to 108 (=27D) frames. The subcode delimit information SSYNC posterior to the time base correction is used for settling the time base position of the PCM audio data when a linking process is executed for the PCM audio data upon occurrence of a track jump in a shock-proof CD player.

As described hereinabove, the subcode delimit information SSYNC is generated in response to at least one of the subcode sync signals S1 and S0, and the time base correction is executed for such subcode delimit information SSYNC as well, whereby it is facilitated to exactly detect the time base position of the PCM audio data from the subcode delimit information SSYNC.

Consequently, it becomes possible to identify the delimiter of the subcode frame on the basis of such subcode delimit information SSYNC and to execute a linking process for the PCM audio data in the individual unitary subcode frames, hence enhancing the reliability of the linking performed for the PCM audio data upon occurrence of any track jump.

What is claimed is:

1. A data processing circuit contained in a disc player for use in reproducing data contained on a digital audio disc and designed to prevent a playback error due to a track jump resulting from a shock to the disc player, the circuit comprising:

means for reading data contained on the digital audio disc, wherein the data read from the disc includes audio data and subcode data;

means for detecting a subcode sync signal in the data read from the disc;

demodulator means for demodulating the data read from the digital audio disc;

means for generating data indicative of an absolute time of the subcode data read from the disc;

a subcode delimit information generator for generating subcode delimit information from the subcode sync signal, the delimit information indicating a delimiter of the subcode data read from the disc;

means for combining the subcode delimit information and the data indicating the absolute time of the subcode data into a subcode delimit information sync signal;

time base correction means for performing a time base correction on both the digital audio data and the subcode delimit information sync signal; and means for reproducing the time base corrected digital audio data.

2. The data processing circuit of claim 1, wherein the means for generating data indicative of an absolute time of the subcode data read from the disc further comprises:

a frame address generator for generating frame address information on the basis of a frame number which represents Q-channel CRC check information and an absolute time contained in the demodulated data, wherein the subcode delimit information generator generates subcode delimit information which includes the frame address information.

3. A method for correcting errors in the playback of audio data from a digital audio disc, where the errors result from a shock delivered to the disc player, the method comprising:

reading audio and subcode data from the digital audio disc;

detecting a subcode sync signal in the data read from the disc;

demodulating the data read from the disc;

generating subcode delimit data from the subcode sync signal;

generating data indicative of an absolute time of the subcode data read from the disc;

combining the subcode delimit data and the data indicating the absolute time of the subcode data into a subcode delimit information sync signal;

performing a time base correction for both the subcode delimit information sync signal and the demodulated audio data; and linking demodulated audio data from a time period prior to the shock to demodulated audio data from a time period after the shock, the linking being accomplished by using the time base corrected subcode delimit information sync signal.

\* \* \* \* \*